United States Patent
Andreasson (10) Patent No.: US 8,571,514 B2
(45) Date of Patent: Oct. 29, 2013

(54) MOBILE DEVICE AND METHOD FOR PROVIDING LOCATION BASED CONTENT

(75) Inventor: Mans Folke Markus Andreasson, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 631 days.

(21) Appl. No.: 12/360,873

(22) Filed: Jan. 28, 2009

(65) Prior Publication Data

US 2010/0190513 A1   Jul. 29, 2010

(51) Int. Cl.
  *H04M 11/04* (2006.01)
(52) U.S. Cl.
  USPC ............ 455/404.2; 455/456.1; 455/456.6; 455/457.73; 455/521; 340/988; 340/990; 340/994
(58) Field of Classification Search
  USPC .......... 455/404.2, 456.1, 456.6, 457, 73, 521, 455/515
  See application file for complete search history.

(56) References Cited

U.S. PATENT DOCUMENTS

| | | | |
|---|---|---|---|
| 5,649,300 A * | 7/1997 | Snyder et al. | 455/517 |
| 6,199,045 B1 | 3/2001 | Giniger et al. | |
| 7,102,510 B2 * | 9/2006 | Boling et al. | 340/539.13 |
| 2007/0097929 A1 | 5/2007 | Dunko et al. | |
| 2008/0019496 A1 | 1/2008 | Taschereau | |
| 2008/0076450 A1 | 3/2008 | Nanda et al. | |
| 2009/0258660 A1 * | 10/2009 | Bush et al. | 455/456.5 |

OTHER PUBLICATIONS

International Search Report for corresponding application No. PCT/EP2009/059719 dated Sep. 20, 2010.
Written Opinion for corresponding application No. PCT/EP2009/059719 dated Sep. 20, 2010.

* cited by examiner

*Primary Examiner* — Ajit Patel
*Assistant Examiner* — Julio Perez
(74) *Attorney, Agent, or Firm* — Renner, Otto, Boisselle & Sklar, LLP (57) ABSTRACT

A mobile device and method are disclosed to provide location based content to a user of a mobile device based on the current location, wherein the provision of location based content depends on obtained location data. The mobile device comprises a location obtaining section for obtaining location data based on locations of the mobile device, location based content section for obtaining location based content, and a controller adapted to compare presently obtained location data with previously obtained location data and to select between a first operation mode and a second operation mode according to the comparison, wherein in the first operation mode the location based content section is adapted to provide location based content to a user of the mobile device according to the current location of the mobile device and in the second operation mode providing of location based content is suppressed.

11 Claims, 5 Drawing Sheets

MOBILE DEVICE AND METHOD FOR PROVIDING LOCATION BASED CONTENT

FIELD OF THE INVENTION

The present invention relates to a mobile device for selectively providing content regarding a location of the mobile device as well as a method for controlling in a mobile device the provision of content based on the location of the mobile device.

BACKGROUND

Map applications are commonly known in the art. These applications commonly run on a desktop or laptop computer and a user may get information about the route to travel, such as streets, between a starting point and end point or simply the size and appearance of a city or region from space.

In particular, a map showing streets or even buildings of a certain region may also indicate sights or other places of interest, such as restaurants, theaters, gas stations, etc. in the region shown on the map. Furthermore, short cuts may be provided to websites which provide more information or pictures of the sight indicated on the map.

With increasing computing power, such map applications may also be used in mobile devices, such as car navigation equipment. For example, navigation software of car navigation equipment may indicate to a driver certain places of interest, which are passed on the road.

Currently, places of interest shown by a map application are often indicated by a symbol that may in some cases contain a link to obtain more information.

A map application for mobile phones that provides additional information about a certain location is for example the Loclet™ application introduced by Sony Ericsson, which lets a user browse location based content in his/her mobile phone. In order to do so, the application has to obtain data of the location of the mobile phone. The obtained location data may represent the geographical position of the mobile phone and may be obtained by the mobile phone using different means. It may use a built-in GPS device, similar to a navigation system in a car, or cell tower information to find the position of the mobile phone to be displayed on a map. Various methods such as time of arrival detection or time difference of arrival detection are known in the art of telecommunications to obtain location data indicating the position of a mobile phone.

It is feasible that the map application alerts a user as soon as the user is in the vicinity of an interesting subject, e.g. a cathedral, if the user is interested in churches. However, such a feature may easily lead to an information overload of the user since the user has no direct control of when or how often content is provided to him/her by the map application. For example, the user may be bothered if content, such as information about a particular church, is repeatedly provided every time the user passes this church.

On the other hand, if the map application, in particular a content provision application that may be a part of the map application, has to be started manually by the user to browse available location based content, places of interest to the user may be missed, since the user may not expect or realize that there are interesting subjects in the vicinity.

Therefore, the possibility of finding unexpected places of interest is reduced.

DISCLOSURE OF INVENTION

A mobile device for selectively providing location based content and a method for controlling in a mobile device the provision of location based content are presented.

An embodiment of the invention provides a mobile device for selectively providing location based content, which comprises a location obtaining section for obtaining location data based on locations of the mobile device and a location based content section for obtaining location based content. The mobile device further comprises a controller adapted to compare presently obtained location data with previously obtained location data and to select between a first operation mode and a second operation mode according to the comparison. In the first operation mode, the location based content section is adapted to provide location based content to a user of the mobile device according to the current location of the mobile device, and in the second operation mode, the provision of location based content is suppressed.

Accordingly, location based content may be selectively provided to the user based on location data so that the location based content section only provides the user with location based content when the user is likely to appreciate it.

According to an embodiment, the controller is adapted to select the second operation mode if the presently obtained location data matches previously obtained location data. Accordingly, if the controller determines that the presently obtained location data has already been obtained before, e.g. the mobile device already visited the current location before, provision of location based content may be suppressed since the location may be known to the user and the corresponding location based content may thus be appreciated less likely. Therefore constant provision of information and an information overflow to the user may be avoided.

According to an embodiment, the controller is adapted to select the first operation mode if the presently obtained location data differs from previously obtained location data. Accordingly, if the controller determines that the presently obtained location data does not correspond to previously obtained location data, e.g. the location has not been visited by the mobile device, the location based content section may provide location based content to the user who is likely to appreciate information regarding an unknown location.

According to an embodiment, the location obtaining section comprises a device for detecting the location of the mobile device to obtain location data. Accordingly, the location obtaining section may actively detect location information, such as a longitude and latitude, for example using a GPS device, to obtain location data.

According to an embodiment, the location obtaining section comprises a timer and is adapted to store locations visited by the mobile device together with a time stamp. Accordingly, visited locations may be sorted dependent on time so that the sequence of locations and even the movement speed between locations of the mobile device may be derived.

According to an embodiment, the location based content section is adapted to obtain location based content from a network server or local information node via wireless transmission according to the current location of the mobile device. Accordingly, location based content may be received each time anew when the location of the mobile device changes. Therefore, a storage unit of the mobile device may be kept small, since new and updated information can be obtained from the Internet, for example, each time the location changes.

According to an embodiment, the location based content section is adapted to register at least one predetermined content type of interest to the user. Accordingly, the location based content section may provide the user only with location based content of the predetermined content type or may preferably provide only location based content of the predetermined content type.

According to an embodiment, the location based content section is adapted to notify the user of location based content of the at least one predetermined content type in the vicinity of the current location of the mobile device. Accordingly, not only location based content regarding the current location but also location based content of locations in the vicinity of the current location may be provided to the user of the mobile device.

According to an embodiment, in the first operation mode, the location based content section is adapted to display location based content to a user on a map of a vicinity of the current location of the mobile device. Accordingly, the user may be able to directly relate interesting content to a location in his/her vicinity.

According to an embodiment, location data are indicative of at least one of: a location, several locations, a location pattern and a motion pattern of the mobile device. Accordingly, it may be differentiated between different ways of roaming in a region and/or passing a known location. For example, a motion pattern for the same route of travel may differ according to the types of movement, for example whether the user travels by train or just walks.

According to an embodiment, a method for controlling in a mobile device the provision of location based content comprises obtaining location data based on locations of the mobile device, obtaining location based content, comparing presently obtained location data with previously obtained location data, and selecting between a first operation mode and a second operation mode according to the comparing step. Then, if the first operation mode is selected, location based content is provided to a user of the mobile device according to the current location of the mobile device, and if the second operation mode is selected, the provision of location based content is suppressed.

Accordingly, the provision of location based content may be controlled based on the presently obtained location data, for example dependent on whether a certain location has been visited previously and an information overload to the user may be avoided.

According to an embodiment, a computer program product is provided which, when loaded into a program memory of a processor or microcontroller, causes the processor or microcontroller to carry out the method described above.

DETAILED DESCRIPTION OF THE PREFERRED EMBODIMENTS

Preferred embodiments of the invention are described with reference to the figures. It is noted that the following description contains examples only and should not be construed as limiting the invention.

Some embodiments relate to obtaining location data based on locations of the mobile device and obtaining location based content, wherein location based content is not always provided when an associated location is visited by the mobile device but the provision of location based content to a user may depend, for example, on whether the current location is a location previously visited by the mobile device.

For example, location based content is not provided to the user of the mobile device, if at a certain time, say some weeks ago, the same location was visited by the mobile device or the mobile device was in the vicinity of the current location, say a location in a, for example, 50 meter radius of the current location. Generally speaking, location based content is provided selectively according to a comparison of presently obtained location data and previously obtained location data.

As described above, it may be possible to limit the provision of location based content on the type of content, such as restaurants or gas stations. Although this approach may reduce undesired location based content, setting preferences by a user is required.

Further, context awareness systems are known which are capable of recognizing when a user is in a typical situation, e.g. when the behavior of the user is repeating, wherein context awareness may be defined as information usable to characterize the situation of a device. In the following, a location of a user of a mobile device may also be regarded as a context and the concept of determining a typical situation may be used to support the determination of whether a location has been visited before or not.

In the subsequent examples, location data, which is comprised by context is used, i.e. location data based on locations of the mobile device may be obtained and/or recorded and compared to newly obtained location data to determine whether a location, several locations, a location pattern or a motion pattern of the mobile device has previously been detected or not. Based on this comparison, a mobile device will select a suitable operation mode. The operation modes available for selection may comprise an active and an inactive mode. In the active mode, location based content may be displayed, e.g. on a map displayed by the mobile device, or the user may simply be alerted that a place of interest is close by. In the inactive mode, the map or content provision application is inactive and waits for activation, which may result from a change in the comparison result. Therefore, inactive may mean that the application is hidden, i.e. currently not running on the mobile device.

Figure 1:
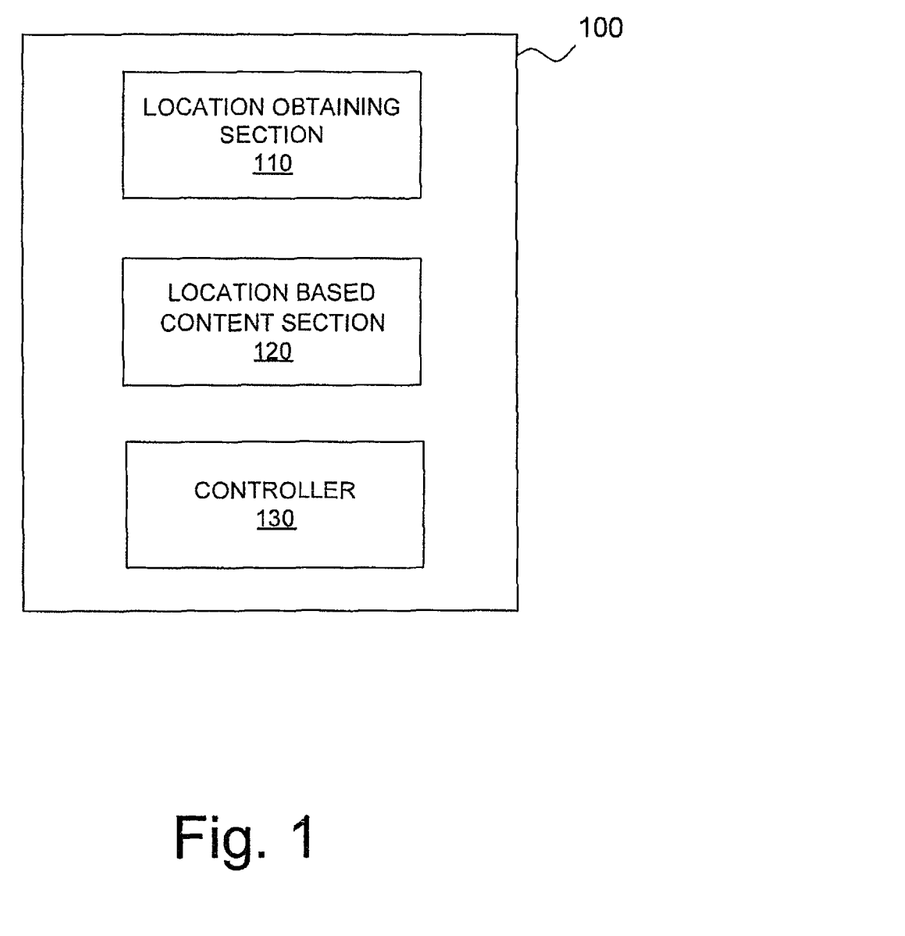
FIG. 1 illustrates elements of a mobile device according to an embodiment of the invention.

In the following, FIG. 1 illustrates elements of a mobile device 100 according to an embodiment of the invention. In detail, the mobile device 100 comprises a location obtaining section 110, a location based content section 120 and a controller 130.

The mobile device 100 is adapted to selectively provide location based content, particularly, location based content is provided depending on location data, such as a certain position or movement pattern of the mobile device, as will be described below. The mobile device 100 may be a mobile terminal, mobile station, personal digital assistant (PDA), portable computer or any other similar device.

Location based content comprises information of any kind that is provided to the user if the mobile device of the user reaches a particular location. For example, location based content may be content that depends on the particular location and thus may be regarded as location information, such as information regarding a building or shop at this location, such as its history, opening hours, address or similar.

The location obtaining section 110 of the mobile device obtains location data based on locations of the mobile device

100. Location data may comprise at least one of a location, several locations, a location pattern and a motion pattern, which will be described in more detail below. Location data may also be considered as context data according to the definition provided above. For example, the location obtaining section 110 repetitively samples locations of the mobile device, so that, when the mobile device moves, a pattern of different locations may be obtained reflecting the movement. In other words, by obtaining and recording successive locations a location pattern or motion pattern may be derived from multiple visited locations.

In this context, obtaining location data is clearly not limited to actively detecting location data by some detecting device but location data may also be obtained from an external device, which will be described in more detail with respect to FIG. 4.

The location based content section 120 obtains location based content. For example, the location based content may be received from an internal storage unit of the mobile device or may be received from an external network server, for example through the Internet to which the network server may be connected. The location based content section 120 will be described in more detail with respect to FIG. 5.

The controller 130 is adapted to compare presently obtained location data with previously obtained location data and to select between a first operation mode and a second operation mode according to the comparison. As described above, the location obtaining section 110 may repetitively sample location data, for example by obtaining different locations of a moving mobile device so that presently obtained location data, which may be a current location of the mobile device or a location pattern of, for example, the last ten visited locations of the mobile device, may be compared to previously obtained location data, which could have been obtained some hours, a day or a week before, for example.

The three elements, i.e. the location obtaining section 110, the location based content section 120 and the controller 130 are connected so that location data may be received by the controller 130 to perform the comparison and so that the controller 130 may instruct the location based content section 120 to provide location based information. However, the functions of the three elements may also be basically integrated in one unit, which will be described later with respect to FIG. 6.

In the first operation mode, the location based content section 120 is adapted to provide location based content to a user of the mobile device 100 according to the current location of the mobile device and in the second operation mode the provision of location based content is suppressed.

In detail, the current location of the mobile device may be obtained by the location obtaining section 110, which may repetitively obtain updates of the locations of the mobile device, as described above. Further, location based content may be obtained for the current location by the location based content section 120, wherein the location based content may already be stored on the mobile device 100 in advance or may be extracted from a network server or similar when needed.

The first operation mode may be regarded as the previously described active mode when the mobile device alerts the user about interesting topics and/or when location based content or a list of it is displayed on a map view or output as speech by a speaker in the mobile device, for example.

The second operation mode may be regarded as the inactive mode when a content provision application, e.g. a function of the location based content section, i.e. the program running on the mobile device providing location based content for a specific region, e.g. included in a map application, is inactive.

In other words, the location based content section 120 does not provide content and may be activated, i.e. woken up, by a notification of the controller 130 or the location obtaining section 110. Similarly, also the map application may be inactive so that not even a map is displayed on a display of the mobile device in the second operation mode. It is noted that even when the map and/or content provision applications of the location based content section are inactive, the location based content section may still be able to obtain location based content.

The location obtaining section 110 may repetitively within a predetermined period or from time to time detect the current location of the mobile device irrespective of the operation mode to determine whether the mobile device is moving and whether location data that may be derived from the last visited location or locations has been previously obtained. Therefore, if the controller 130 determines, when comparing presently obtained location data with previously obtained location data, that the presently obtained location data is known, for example, the content provision application may be activated, namely the controller may select the first operation mode.

Alternatively, the functions of the controller 130 may also be integrated in the location obtaining section 110 so that the location based content section 120 may receive an incoming switch notification from the location obtaining section 110, declaring that the user has entered a previously known location or location data so that the mobile device switches in the second operation mode. However, when the incoming switch notification declares that the user has entered an unknown location, the mobile device may switch to the first operation mode, in which the location based content section 120 provides location based content to the user.

Figure 2:
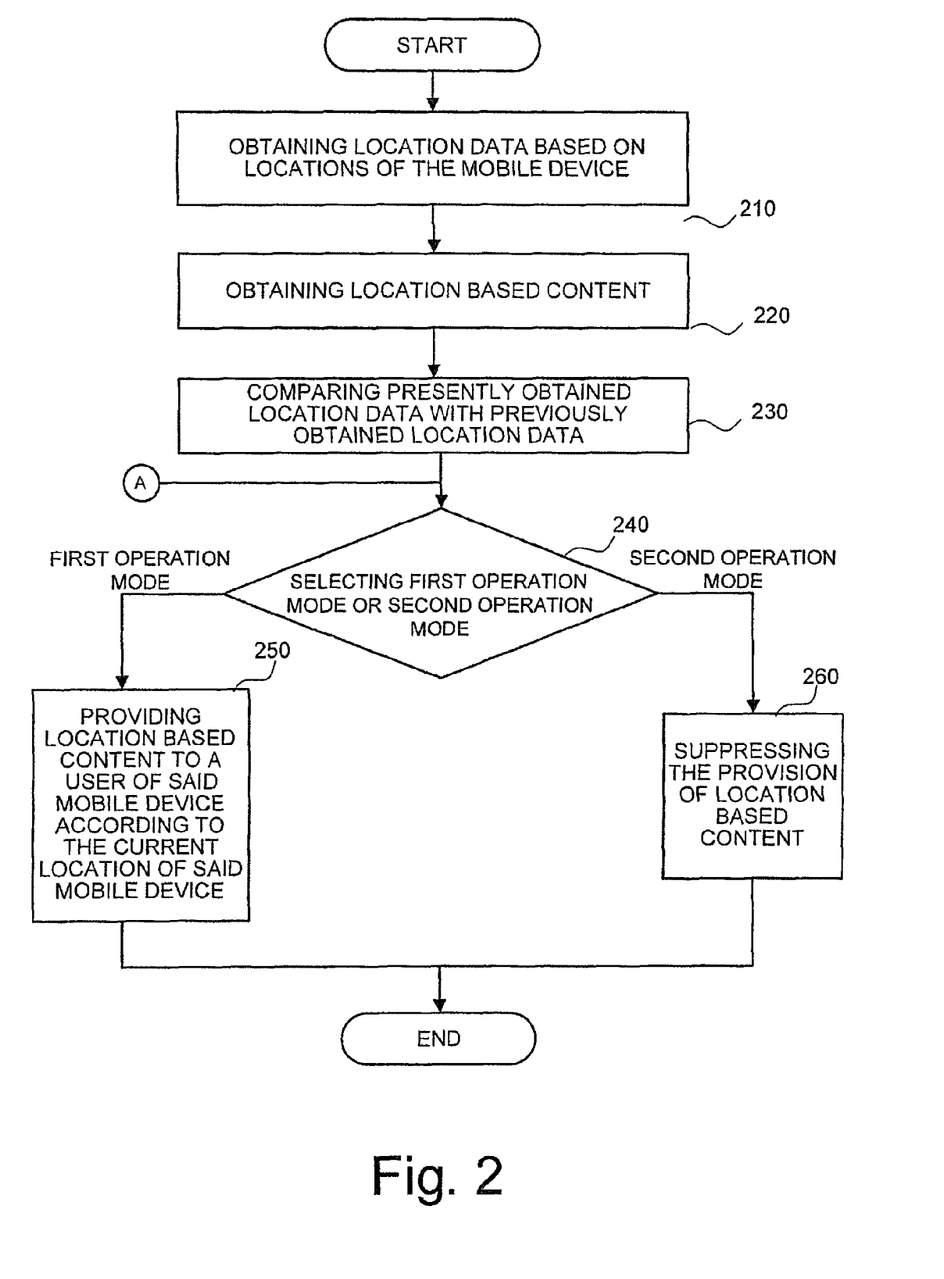
FIG. 2 illustrates operations of a method for controlling the provision of location based content in a mobile device according to an embodiment of the invention.

In the following, operations of a method for controlling the functions in a mobile device, such as the mobile device 100, will be described with regard to FIG. 2. FIG. 2 shows a flow diagram of operations of a method for controlling the provision of location based content, for example in mobile device 100 shown in FIG. 1.

In a first step 210, when starting operations, location data based on locations of the mobile device is obtained. For example, as described above, the mobile device detects its location using a device, such as a GPS device or obtains its location with the help of nearby base stations, in particular, if the mobile device is a mobile phone.

In a subsequent step 220, location based content is obtained. Details regarding the location based content have been described above.

In a next step 230, presently obtained location data is compared to previously obtained location data. For example, step 210 may be performed each time the mobile device changes its location, which may practically be carried out by repetitively or periodically determining the location of the mobile device to obtain location data. Therefore, presently obtained location data, which may be new location data obtained in the last couple of minutes, may be compared to previously obtained location data which may be location data obtained hours, days or weeks before and which may still be stored on the mobile device.

In step 240, it is then determined whether to select a first operation mode or a second operation mode according to the previous comparison of location data. If the first operation mode is selected, the flow proceeds to step 250, in which location based content is provided to a user of the mobile device. In detail, the provided location based content relates to the current location of the mobile device, namely gives background information about the current location, for example the history of a building at this location, the menu of a restaurant at this location or the opening hours of a shop at this location. On the other hand, if the second operation mode is selected, the flow of operations proceeds to step 260 and the provision of location based content is suppressed, i.e. the location based content section 120 or part of it, for example, is inactive and thus does not provide location based content.

In the following, the selection step 240 of FIG. 2 and the selection function of the controller 130 of FIG. 1 are described in more detail with respect to FIG. 3.

Figure 3:
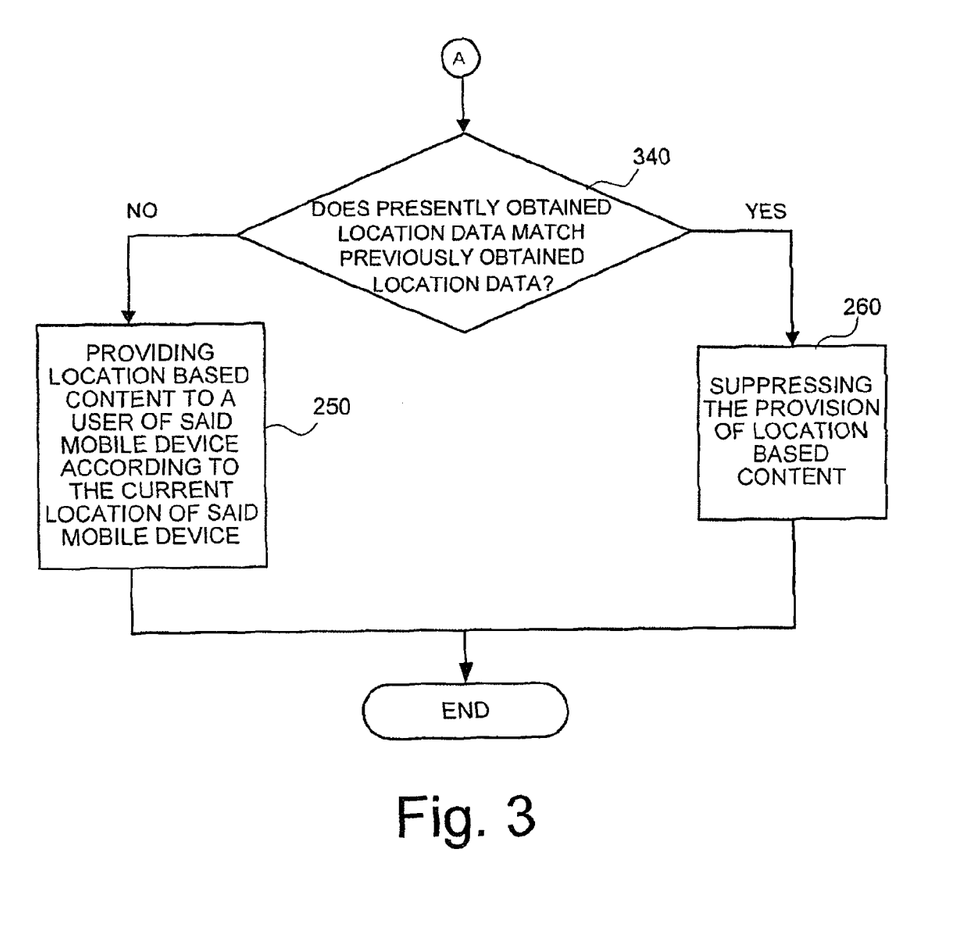
FIG. 3 illustrates a determination whether to select a first operation mode or a second operation mode in the method of FIG. 2 in more detail.

In FIG. 3, similar or the same reference signs indicate similar or the same steps. Further, it is indicated in FIG. 3 that the first three steps 210, 220 and 230 of FIG. 2 are the same steps as in FIG. 3. The subsequent step, step 340, describes a more detailed example of the selection step 240 in FIG. 2. In this example, it is determined whether the presently obtained location data matches previously obtained location data.

It should be understood that "matches" does not necessarily have to relate to a perfect match. For example, in the simplest case if location data relates to a single location defined by the longitude and latitude, e.g. measured by a GPS device, a match may be already be assumed if a high degree of coincidence is present, for example if the current location is in a short distance from the previously obtained location, e.g. within a 5 or 10 meter radius of the previously obtained location. In other words, presently obtained location data is similar or corresponds to previously obtained location data, if the presently obtained location data is covered by a range corresponding to the vicinity of a previously obtained location or location data.

If the presently obtained location data matches previously obtained location data, it may be determined that the location of the mobile device has already been visited by the mobile device or in other words, if the mobile device has always been used by the same user, the location has been visited by the user of the mobile device. Therefore, the location is very likely to be known to the user and the user may be bored or annoyed if the mobile device provides information regarding this location so that provision of location based content is suppressed in step 260.

However, if the presently obtained location data does not match previously obtained location data, location based content is provided in step 250 to the user, since the user is most likely willing to explore the surroundings of the current location, since the selection step indicates that the user is in an unknown location.

Therefore, the above may be summarized as follows, the controller in the mobile device selects the second operation mode if the presently obtained location data matches previously obtained location data and selects the first operation mode if the presently obtained location data differs from previously obtained location data.

Figure 4:
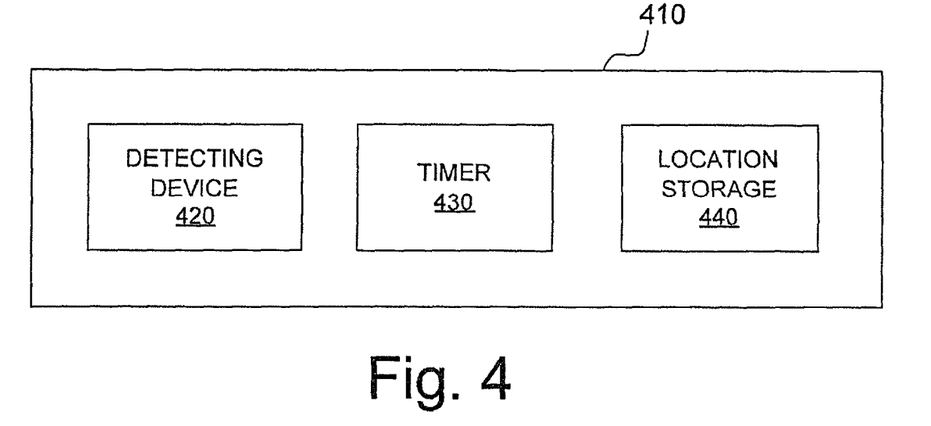
FIG. 4 illustrates elements of a mobile device according to a further embodiment of the invention.

In the following, FIG. 4 illustrates details of an element of a mobile device. In particular, FIG. 4 illustrates details of an example of a location obtaining section 410, which may be used in the mobile device 100 of FIG. 1. As shown in FIG. 4, the location obtaining section 410 comprises a detecting device 420, a timer 430 and a location storage 440.

The location obtaining section 410 may comprise the detecting device 420 for detecting the location of the mobile device to obtain location data. For example, the detecting device 420 may be a GPS device for detecting longitude and latitude of the position of the mobile device, such as mobile device 100. However, it is understood that obtaining location data is not limited to a detection with a detecting device but location data may also be obtained from base stations in a mobile network by triangulation, which is known in the art for location detection of a mobile phone, if the mobile device is adapted to communicate with a mobile network.

Further, the location obtaining section 410 may comprise the timer 430 and may store locations visited by the mobile device together with a time stamp in the location storage 440. In detail, the timer 430 may provide the time at which the mobile station visited a certain location. For example, the GPS device detects the exact coordinates of a location, e.g. the longitude and latitude of the location, and the timer 430 provides a time stamp indicating the time at which this location has been detected so that subsequently the longitude and latitude of the location and the corresponding time may be stored in the location storage 440 of the location obtaining section 410.

By recording the coordinates of the visited location and the corresponding time, different types of location data may be derived. As discussed above, in the simplest case location data may constitute a location. However, more detailed information may also be obtained. For example, patterns may be obtained that may be reoccurring so that it may be determined whether the user behaves as he/she does on every workday, e.g. goes from home to the next subway station, takes the subway to work, etc. In this example, the locations home, subway station and work as well as possibly other intermediate locations may be recorded in the location storage 440. However, since the location storage 440 may record the locations in a certain order, namely first home, then subway station and then work, a location pattern may be derived, namely a pattern showing locations in a certain order. This pattern may be reoccurring every workday.

Furthermore, even a motion pattern may be derived if also the time of the visited locations is recorded. The time may be recorded using a timer so that the stored locations also give an indication of the time difference needed to travel from one location to the next location. From this information, it may be derived whether the user of the mobile device travels slowly, for example by foot, or quickly, for example by car or train. Whenever the user behavior indicates known location data, e.g. a similar or same motion pattern as previously, the second operation mode may be selected so that the provision of content is suppressed, i.e. the content provision application is inactive.

It is noted that a motion pattern is not limited to how a user and thus a mobile device is translated in space, measured by location and time. Other motions of the device are possible, e.g. vibration and rotation patterns. These may be measured using suitable types of motion sensors, such as accelerometers and gyroscopes, etc. The analysis of an output from a motion sensor may tell if the device has traveled using a specific vehicle or by foot.

For example, if a user normally travels in an area by car and then one day by bus, and it is possible to distinguish between car and bus using analysis of a motion sensor, e.g. by the number of stops on the way or the vibration caused by the bus, then the controller may decide to not suppress the provision of information when the user suddenly travels by bus.

However, it may also be detected that the user behavior changes to a not previously detected behavior indicated by unknown location data so that the first operation mode may be selected.

As described above, location data may constitute or be part of context data also including information of how a user moves. In addition to the traveling speed, which may be derived from a time difference and a distance between the corresponding two locations, as described above, the mobile device may be provided with an acceleration sensor, which may detect whether the user carrying the mobile device is walking, running or cycling. For example, if the user keeps the mobile device in his/her pocket or attaches the sensor to his/her shoes, the acceleration sensor may detect the steps of the user.

Therefore, the mobile device may learn automatically by itself when to stop to provide the user with information regarding a current location and when not. Thereby, the mobile device may play the role of a real world explorer assistant that learns to determine the normal ways of life of the user, e.g. being at home, going to school or work, shopping at the usual places, visiting friends and family etc. As long as a normal way of life, i.e. normal behaviour, is detected, the location based content section will remain inactive and not disturb the user. However, as soon as the user enters new territory or otherwise behaves in a previously unknown pattern, the location based content section of the mobile device may support the user in exploring the new territory.

It is noted that this concept even works if the user travels to known locations but in a different way, indicated by a different motion pattern, for example. For example, the user may walk in a town that he/she usually passes by quickly by train when going to work. The difference between walking and the train ride may be indicated by the motion pattern indicating different traveling speeds so that it may be derived that the user is not doing something ordinary.

Next, another element of a mobile device according to another embodiment of the invention will be described in more detail with respect to FIG. 5. In particular, a location based content section, similar to the location based content section 120 of the mobile device 100 of FIG. 1, will be described in the mobile device 500 of FIG. 5.

Figure 5:
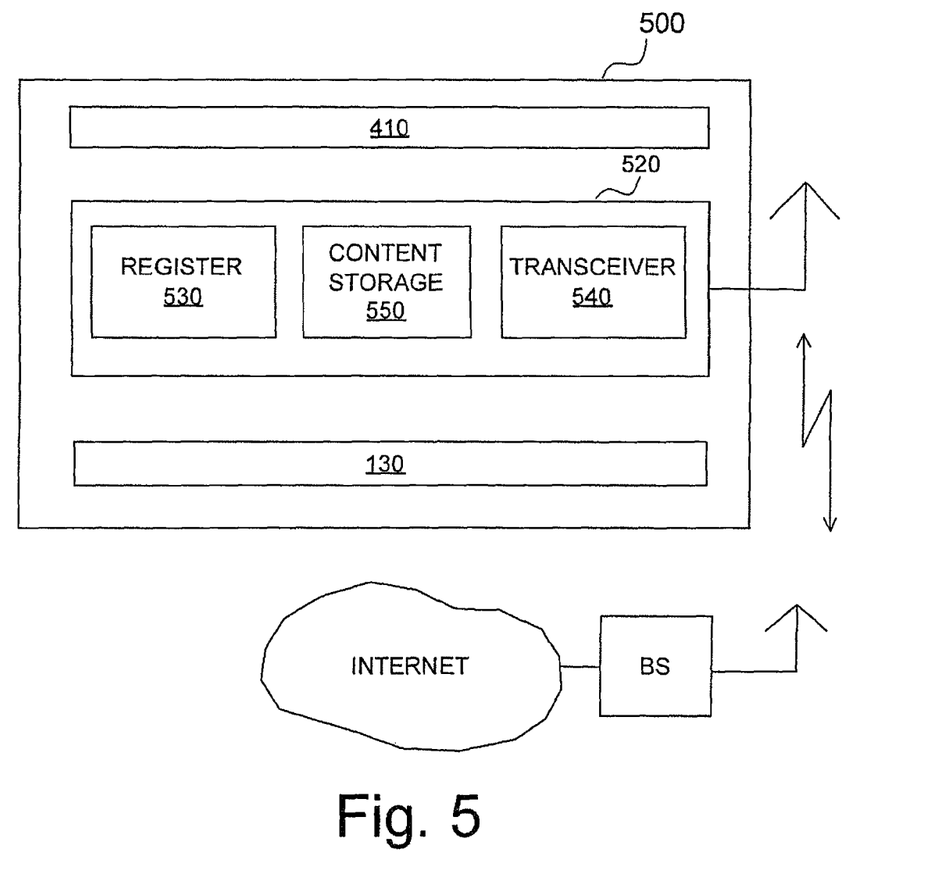
FIG. 5 illustrates elements of a mobile device according to a further embodiment of the invention.

The mobile device 500 of FIG. 5 comprises a location obtaining section 110 of FIG. 1 or 410 of FIG. 4, a location based content section 520 and the controller 130 described above.

In detail, the location based content section 520 comprises a register 530, a content storage 550 and a transceiver 540.

The location based content section 520 may obtain location based content from a network server or local information node via wireless transmission according to the current location of the mobile device. For example, as indicated in FIG. 5 by the two antennas and wireless transmission, the transceiver 540 may request information regarding a certain location at a network server (not shown), which may be part of or connected to the Internet, and subsequently may receive location based content from the network server. As mentioned, the network server may be part of the Internet or connected to the Internet so that, if the mobile device has wireless communication capabilities similar to a mobile phone, location based content may be received by the mobile device 500 via a base station BS.

However, this concept is clearly not limited to mobile radio communication but also other wireless communication types may be used, such as Bluetooth or WLAN technologies. For example, the transceiver 540 may communicate with a local information node, which may be a Bluetooth node or WLAN node. It is thus also feasible that the location of the mobile device is determined based on an identification of the node. Since the node may have a limited transmission range, when close to the node not only location based content may be transmitted but also an identification regarding the current location, namely that the mobile device is in a transmission range of the node which is placed at a certain position.

Location based content received via the transceiver 540 may then be stored in the content storage 550 or directly outputted, i.e. provided to the user visually or as sound.

It is also feasible that location based content is stored in advance in the content storage 550 of the mobile device 500 before the corresponding location is visited. For example, when on holiday in a particular city or on a particular island, information about the city or the island, respectively, may be downloaded in advance wirelessly or even by wire once the user arrives in the city or on the island.

Therefore, the location based content section 520 may be able to quickly retrieve location based content from the content storage 550 once the mobile device reaches a location for which information is available without having to download the information from a network server or similar at the time of arrival at this location. This seems to be especially advantageous in less populated areas which may have fewer places of interest and in which the whole area may not be covered by wireless communication.

On the other hand, location based content may be downloaded when close to a specific sight or shop or when at the same location of the sight or shop. Therefore, several possibilities are available which may be preset in the mobile device and which may be used according to the environment, such as rural or urban, the type of connection to a content providing network and the amount of information available for the region.

Furthermore, the location based content section may comprise a register 530 to register a predetermined content type of interest to the user. For example, if the user is interested in historic buildings, the location based content section 520 may provide the user preferably with information regarding historic sights. In particular, the user may be provided with information regarding historic sights that may not be at the current location of the user but in the vicinity, for example in a 1000 meter radius.

Therefore, the mobile device may provide the user with content which is appreciated by the user, and only at locations that are unknown to the user. In particular, the location based content section 120 or 520 may only be triggered to start and provide location based content so as to notify the user of interesting subjects in the vicinity, based on the detection that the user's behavior corresponds to unknown location data, e.g. the user is in a new location or in a known location but with a new motion pattern.

The location based content section 120 or 520 may notify the user of location based content of the predetermined content type in the vicinity of the current location of the mobile device for example via visual representation or audible sounds, such as speech, which will be described in more detail with respect to FIG. 6 in the following.

Figure 6:
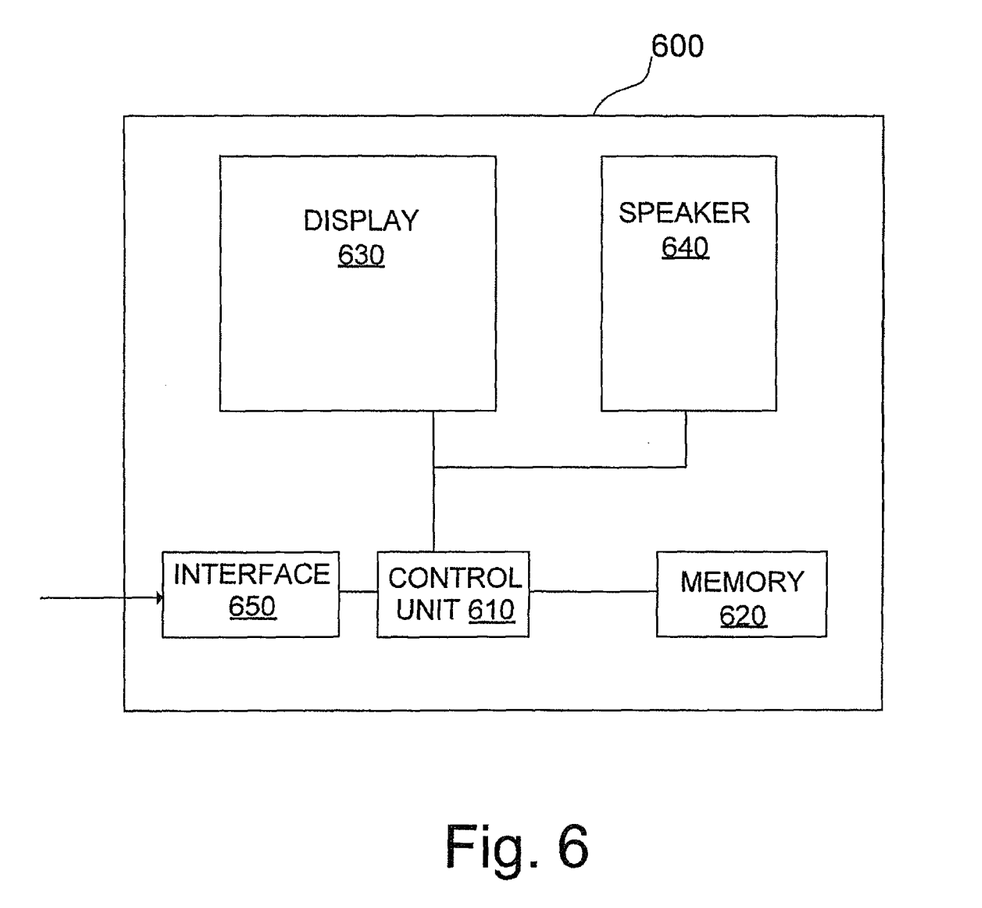
FIG. 6 illustrates elements of a mobile device according to a further embodiment of the invention.

FIG. 6 illustrates elements of a mobile device 600 according to another embodiment, similar to the mobile devices 100 and 500, and the above described method for controlling provision of location based content may also be carried out in mobile device 600.

The mobile device 600 in FIG. 6 comprises a control unit 610, a memory 620, a display 630, a speaker 640 and an interface 650.

For example, the previously described elements, namely the location obtaining section, location based content section and controller, as well as their functions may be realized by the hardware arrangement shown in FIG. 6. Such a hardware arrangement may comprise hardwired circuits or ASCIs (application specific integrated circuits) or software or any suitable combination of the above.

For example, in FIG. 6, the functions of the elements of FIGS. 1 and 5 may be realized by the control unit 610 including a processor running suitable software that may be stored in memory 620. Accordingly, all functions may be integrated and carried out by one processor. Therefore, the term "section" in the above described embodiments should not be construed as limiting the individual elements to a separate tangible part but should be understood as a kind of functional entity.

As described, several functions of the mobile device may be incorporated in the control unit 610 comprising or being connected to a memory, e.g. memory 620, such as a RAM, ROM, hard disk, (E)EPROM, a disk, a flash memory or a suitable combination. For example, a program code stored in the memory 620 may be a software program including instructions adapted to cause the processor in the control unit to carry out the above described method steps and functions.

In other words, a program may be provided including instructions adapted to cause a processor, such as the processor of the control unit 610, to carry out combinations of the above described method steps.

Moreover, a computer readable medium may be provided in which the program is embodied. The computer readable medium may be tangible, such as a disk or other data carrier or may be intangible, constituted by signals suitable for electronic, optic or any other type of transmission. A computer program product may comprise the computer readable medium and when loaded into a program memory of a computer, processor or microcontroller causes the processor or microcontroller to carry out the above described operations.

The memory 620 may also comprise the location storage 440 and the content storage 550.

Further, the interface 650 may be used to obtain location based content and to perform functions similar to the transceiver 540 of FIG. 5. Several devices, such as a GPS device and/or one or more acceleration sensors, may also be connected to the control unit 610, which are not shown in FIG. 6.

The control unit 610 and in particular the function of the location based content section, may cause the display of location based content to a user, e.g., on a map of the vicinity of the current location of the mobile device on the display 630 in the first operation mode. Alternatively or additionally, location based content may also be output as speech by the speaker 640 in the mobile device 600, which, similar to the display 630 is connected to the control unit 610 as shown in FIG. 6.

As described above, the embodiments allow for selectively providing location based content to a user of a mobile device by making the provision of location based content dependent on the current location of the mobile device. Therefore, an information overload to the user is avoided and only selected information is provided to the user based on the user's prior behavior and movements.

It will be appreciated that various modifications and variations can be made in the described elements, mobile devices and methods as well as in the construction of this invention without departing from the scope or spirit of the invention.

The invention has been described in relation to particular embodiments which are intended in all aspects to be illustrative rather than restrictive. Those skilled in the art will appreciate that many different combinations of hardware, software and firmware will be suitable for practicing the invention.

Moreover, other implementations of the invention will be apparent to the skilled person from consideration of the specification and practice of the invention disclosed herein. It is intended that the specification and the examples be considered as exemplary only. To this end, it is to be understood that inventive aspects lie in less than all features of the single foregoing disclosed implementation or configuration. Thus, the true scope and spirit of the invention is indicated by the following claims.

The invention claimed is:

1. A mobile device for selectively providing location based content, comprising:
a location obtaining section for obtaining location data based on locations of the mobile device and storing the obtained location data in a location storage;
a location based content section for obtaining location based content; and
a controller configured to compare the location data as presently obtained by the location obtaining section with the location data as previously obtained and stored in the location storage by the location obtaining section, and to select between a first operation mode and a second operation mode according to the comparison,
wherein in said first operation mode said location based content section is configured to provide the obtained location based content to a user of said mobile device according to the current location of said mobile device and in said second operation mode providing of the obtained location based content is suppressed, and
wherein said controller is configured to select said second operation mode if the presently obtained location data matches previously obtained location data.

2. The mobile device of claim 1, wherein
said controller is configured to select said first operation mode if the presently obtained location data differs from previously obtained location data.

3. The mobile device of claim 1, wherein
said location obtaining section comprises a sensor for detecting the location of said mobile device to obtain location data.

4. The mobile device of claim 1, wherein
said location obtaining section comprises a timer and is configured to store locations visited by said mobile device together with a time stamp.

5. The mobile device of claim 1, wherein
said location based content section is configured to obtain said location based content from a network server or local information node via wireless transmission according to the current location of said mobile device.

6. The mobile device of claim 1, wherein said location based content section is configured to register at least one predetermined content type of interest to the user.

7. The mobile device of claim 6, wherein said location based content section is configured to notify the user of location based content of the at least one predetermined content type in the vicinity of the current location of said mobile device.

8. The mobile device of claim 1, wherein in said first operation mode said location based content section is configured to display location based content to a user on a map of a vicinity of the current location of said mobile device.

9. The mobile device of claim 1, wherein location data are indicative of at least one of a location, several locations, a location pattern and a motion pattern of the mobile device.

10. A method for controlling in a mobile device the provision of location based content, comprising the steps:
obtaining location data based on locations of the mobile device;
storing the obtained location data in a location storage;
obtaining location based content;
comparing the presently obtained location data with the previously obtained and stored location data;
selecting between a first operation mode and a second operation mode according to the comparing step;
if in said first operation mode, providing the obtained location based content to a user of the mobile device according to the current location of the mobile device, and if in said second operation mode, suppressing the provision of the obtained location based content; and wherein said selecting comprises selecting said second operation mode if the presently obtained location data matches previously obtained location data.

11. A non-transitory computer readable medium comprising executable code stored thereon, which when executed by a processor or microcontroller, causes the processor or microcontroller to carry out the method of claim 10.

\* \* \* \* \*